US008082516B2

(12) United States Patent
Vaca et al.

(10) Patent No.: US 8,082,516 B2
(45) Date of Patent: Dec. 20, 2011

(54) PREVIEW PANEL

(75) Inventors: Julio Vaca, Wakefield, MA (US); Adam Soroca, Cambridge, MA (US)

(73) Assignee: Lycos, Inc., Waltham, MA (US)

( * ) Notice: Subject to any disclaimer, the term of this patent is extended or adjusted under 35 U.S.C. 154(b) by 165 days.

(21) Appl. No.: 11/590,682

(22) Filed: Oct. 31, 2006

(65) Prior Publication Data

US 2007/0226192 A1 Sep. 27, 2007

Related U.S. Application Data

(60) Provisional application No. 60/732,463, filed on Nov. 1, 2005.

(51) Int. Cl.
G06F 3/00 (2006.01)
G06F 17/30 (2006.01)

(52) U.S. Cl. ........ 715/781; 715/738; 715/769; 715/809; 707/707

(58) Field of Classification Search .................. 715/764, 715/765, 781, 804, 733, 738, 769, 803, 805, 715/808, 809; 707/3, 706, 758, 759, 769, 707/805, 707

See application file for complete search history.

(56) References Cited

U.S. PATENT DOCUMENTS

| 5,631,825 | A | 5/1997 | van Weele et al. |
| 5,999,929 | A | 12/1999 | Goodman |
| 6,026,409 | A | 2/2000 | Blumenthal |
| 6,113,394 | A | 9/2000 | Edgar |
| 6,247,020 | B1 | 6/2001 | Minard |
| 6,615,237 | B1 | 9/2003 | Kyne et al. |
| 6,832,355 | B1 | 12/2004 | Duperrouzel et al. |
| 6,851,089 | B1 | 2/2005 | Erickson et al. |
| 6,876,997 | B1 | 4/2005 | Rorex et al. |
| 6,912,532 | B2 | 6/2005 | Andersen |
| 6,961,731 | B2 | 11/2005 | Holbrook |
| 7,100,123 | B1 | 8/2006 | Todd et al. |
| 7,162,493 | B2 * | 1/2007 | Weiss et al. ............ 1/1 |
| 7,194,546 | B2 | 3/2007 | Kameoka et al. |
| 7,213,013 | B1 * | 5/2007 | Subramaniam et al. ......... 707/3 |
| 7,424,510 | B2 * | 9/2008 | Gross et al. .................. 709/203 |
| 7,451,131 | B2 * | 11/2008 | Curtis et al. ......................... 1/1 |
| 7,873,622 | B1 * | 1/2011 | Karls et al. .................... 707/707 |
| 2001/0038395 | A1 | 11/2001 | Holtzblatt et al. |
| 2002/0023023 | A1 | 2/2002 | Borecki et al. |
| 2003/0184582 | A1 | 10/2003 | Cohen |
| 2004/0018506 | A1 * | 1/2004 | Koehler et al. .................. 435/6 |
| 2004/0049541 | A1 | 3/2004 | Swahn |
| 2004/0111671 | A1 | 6/2004 | Lu et al. |
| 2004/0122808 | A1 | 6/2004 | Martin et al. |
| 2005/0076019 | A1 | 4/2005 | Jackson et al. |
| 2005/0235220 | A1 | 10/2005 | Duperrouzel et al. |

(Continued)

OTHER PUBLICATIONS

"EAST Search engine", screenshot of EAST interface, 1999, pp. 1-2.*

(Continued)

Primary Examiner — Xiomar L Bautista
(74) Attorney, Agent, or Firm — Fish & Richardson P.C.

(57) ABSTRACT

Generating a preview panel includes generating an auxiliary display in response to an action performed in a primary display, where the primary display is for presenting one or more entries that correspond to results of a Web-based search, receiving data identifying an entry from the primary display, and generating, for presentation in the auxiliary display, information corresponding to the entry from the primary display.

20 Claims, 4 Drawing Sheets

U.S. PATENT DOCUMENTS

| | | |
|---|---|---|
| 2005/0256766 A1 | 11/2005 | Garcia et al. |
| 2006/0069618 A1* | 3/2006 | Milener et al. ............... 705/14 |
| 2006/0085741 A1* | 4/2006 | Weiner et al. ............... 715/517 |
| 2006/0218499 A1* | 9/2006 | Matthews et al. ............ 715/765 |
| 2006/0224615 A1* | 10/2006 | Korn et al. ................... 707/102 |
| 2006/0277167 A1* | 12/2006 | Gross et al. ................... 707/3 |
| 2006/0294476 A1* | 12/2006 | Buckley ....................... 715/781 |
| 2007/0074125 A1* | 3/2007 | Platt et al. ................... 715/760 |
| 2007/0299825 A1* | 12/2007 | Rush et al. ................... 707/3 |
| 2008/0077558 A1* | 3/2008 | Lawrence et al. ............ 707/3 |
| 2008/0133487 A1 | 6/2008 | Gross et al. |
| 2008/0228589 A1* | 9/2008 | Koehler et al. ............... 705/26 |
| 2010/0138400 A1* | 6/2010 | Curtis et al. ................. 707/706 |

OTHER PUBLICATIONS

Page et al., "The PageRank Citation Ranking: Bringing Order to the Web", Stanford Digital Library Technology Project (1998), pp. 1-17.

Action and Response History in U.S. Appl. No. 10/679,788, retrieved on Aug. 12, 2009.

Sidestep.com web page [online] Retrieved from the Internet: <URL:http://www.sidestep.com/?redir=B>, [retrieved on Jan. 21, 2004].

U.S. Appl. No. 60/684,253, filed May 20, 2005.

U.S. Appl. No. 60/717,547, filed Sep. 20, 2005.

* cited by examiner

PREVIEW PANEL

CROSS-REFERENCE TO RELATED APPLICATION

This patent application claims priority to U.S. Provisional Application No. 60/732,463, which was filed on Nov. 1, 2005. The contents of U.S. Provisional Application No. 60/732,463 are hereby incorporated by reference into this application as if set forth herein in full.

TECHNICAL FIELD

This patent application relates generally to a preview panel for presenting search results and, more particularly, to a preview panel that allows users to copy search results from a primary panel for display in the preview panel.

BACKGROUND

A browser is an application program that enables a user to view, retrieve, and interact with content on the World Wide Web (Web). Browsers include a graphical user interface (GUI), which is generally window-based and relatively user-friendly. Browsers typically use Hypertext Transfer Protocol (HTTP) to make requests of Web servers throughout the Internet on behalf of a user. Example of browsers in current use include Firefox®, Opera®, Netscape®, Mosaic® and Internet Explorer®.

A browser can be used to access a search engine, such as Lycos®. The search engine can be used to locate content on the Web that is of interest to a user. In this regard, search engines typically include databases that index words from pages or other documents on numerous Web sites. As is well known, a user enters a search term into a browser; the search engine searches its database for document(s) containing the search term; and the search engine provides a list of documents (e.g., hyperlinks) that contain those search terms. The list is subsequently displayed in the user's browser.

SUMMARY

This patent application describes methods and apparatus, including computer program products, for generating a preview panel for use in presenting search results.

In general, this patent application describes receiving data from a first panel, generating a second panel in response to the data from the first panel, where the second panel supplements the first panel, identifying a first item from the first panel, and generating a second item corresponding to the first item for display in the second panel. This aspect may also include one or more of the following features.

The first panel may comprise a graphical user interface that is generated by a search engine. The first panel may be for displaying search results. The first item may be among the search results. The second panel may comprise a graphical user interface. The second item may contain information from the first item.

Identifying the first item may comprise receiving data that identifies the first item. The data may be received in response to user input. At least part of the second item may contain information that is identical to information in at least part of the first item.

A third item may be identified from a third panel. The first item may be obtained via a first search and the third item may be obtained via a second search. A fourth item corresponding to the third item may be generated for display in the second panel. At least part of the fourth item may contain information that is identical to information in at least part of the third item.

The first item may comprise a Web search result entry that includes a uniform resource locator (URL) hyperlink. The first item from the first panel may be identified based on information obtained from a hyperlink associated with the first item.

In general, this patent application also describes generating an auxiliary display in response to an action performed in a primary display, where the primary display is for presenting one or more entries that correspond to results of a Web-based search, receiving data identifying an entry from the primary display, and generating, for presentation in the auxiliary display, information corresponding to the entry from the primary display. This aspect may also include one or more of the following features.

The information may comprise a copy of the entry from the primary display. Data may be received that identifies an entry from a second primary display. Information that corresponds to the entry from the second primary display may be generated for presentation in the auxiliary display.

An article of manufacture may store instructions that are executable to perform all or part of each of the foregoing methods and features. The article of manufacture may include one or more machine-readable media that store instructions that are executable by one or more processing devices to implement the methods and/or features.

The details of one or more examples are set forth in the accompanying drawings and the description below. Further features, aspects, and advantages will become apparent from the description, the drawings, and the claims.

DESCRIPTION OF THE DRAWINGS

FIG. 2 is a block diagram of an exemplary graphical user interface (GUI) for displaying results of a search conducted by a search engine.

FIG. 3 is a block diagram of an exemplary GUI containing a primary panel for displaying search results and a preview panel for displaying selected ones of the search results displayed in the primary panel.

DETAILED DESCRIPTION

Figure 1:
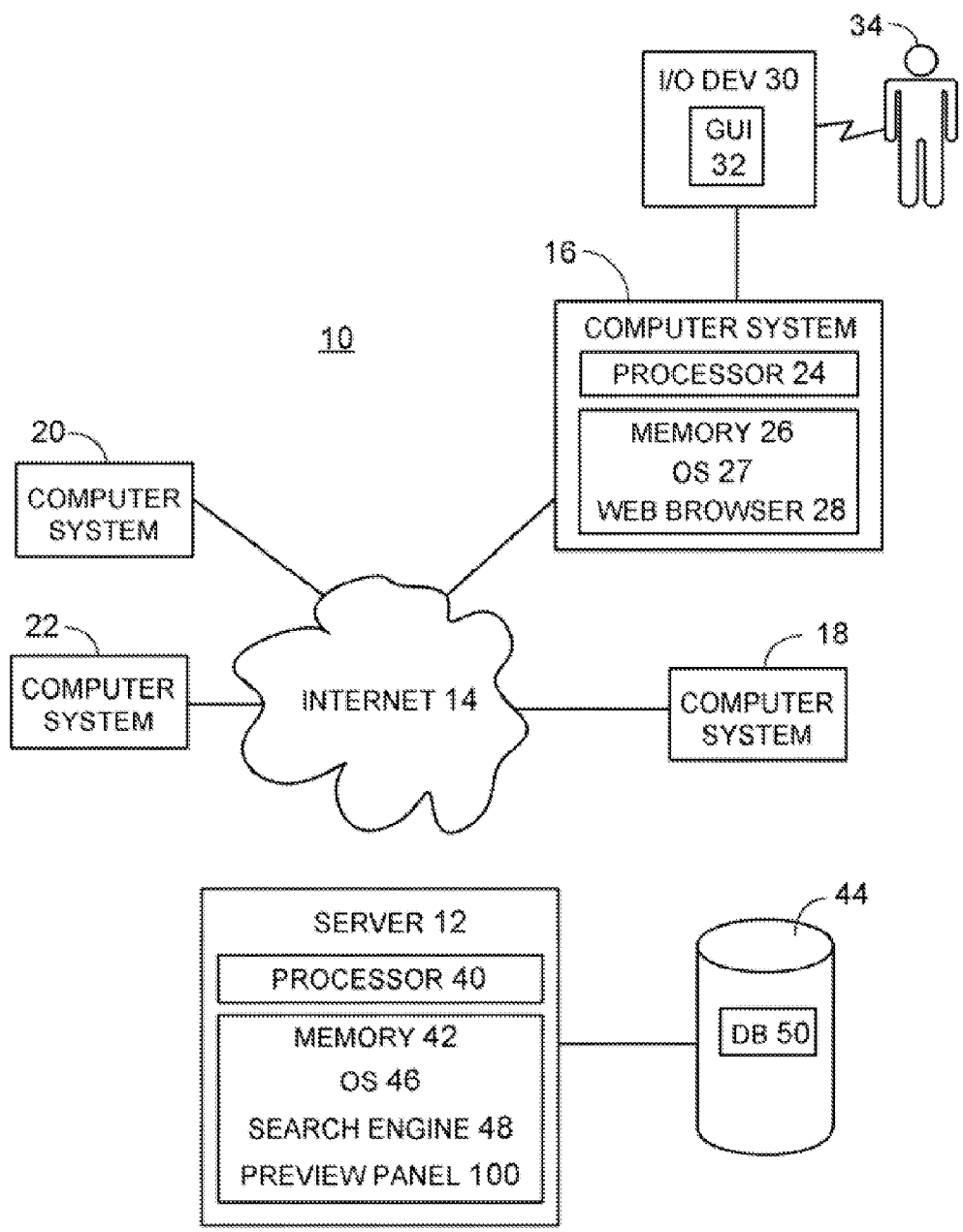
FIG. 1 is a block diagram of an exemplary network on which the processes described herein may be implemented.

FIG. 1 shows a network 10, over which network devices can communicate. Network 10 may be an IP-enabled network, and may include a local area network (LAN), such as an intranet, and/or a wide area network (WAN), which may, but need not, include the Internet. Network 10 may be wired, wireless, or a combination of the two.

In this example, network 10 may include one or more devices 16, 18, 20 and 22 that are capable of searching the Web using a search engine, such as that provided by Lycos®. The devices may be desktop or laptop computers, personal digital assistants (PDAs), cellular or standard telephones, video-gaming devices, or the like. Although only four such devices are shown in network 10, any number or types of devices may be included.

Network 10 may also includes multiple other devices (not shown), including server 12. These other devices may have any type of architecture and/or programming that enables communication over network 10. One such device, namely server 12, may include one server 12 or multiple servers, e.g., a server farm.

Server 12 may be any type of processing device that is capable of receiving and storing data, and of communicating with devices 16, 18, 20 and 22 over network 10. Server 12 includes one or more processor(s) 40 and memory 42 that stores computer programs that are executable by processor(s) 40. In this regard, memory 42 stores one or more computer programs for implementing an operating system 46, a search engine 48, and a preview panel process 100 (described below). Preview panel process 100 operates in conjunction with search engine 48. One or more storage devices 44 associated with server 12 stores a database 50, which is described below. FIG. 1 shows these storage devices as external to server 12; however, they may be internal or a combination of internal and external.

In this implementation, devices 16, 18, 20 and 22 are computer systems and server 12 is in communication with those computer systems over Internet 14. It is noted that the communication may be over any type of network, including any of those noted above, and that Internet 14 is merely used as an example. Each computer system, such as computer system 16, includes one or more processor(s) 24 and memory 26. In this implementation, memory 26 stores an operating system 27 and a Web browser (browser) 28, which are executable by processor(s) 24 to perform at least part of the processes described herein. One example of a Web browser is Internet Explorer® provided by Microsoft®. Other examples include Firefox® and Opera®. Each computer system may also include an input/output (I/O) device 30, through which a user 34 interacts with the computer system. The I/O device may include a keyboard, mouse, screen (containing GUI 32), and the like.

Browser 28 can be used to access search engine 48. Search engine 48, and/or processes associated with search engine 48, makes use of robots, spiders, crawlers, and various other computer programs to trace hyperlinks across the Web in order to populate database 50. In more detail, such computer programs move from one Web site to another, index Web documents at those sites, and send indexed results back to database 50, which here resides on the storage device 44 (or in memory 42). The results stored in database 50 are later used to respond to a search query. That is, a browser provides a search query, e.g., one or more keywords, to search engine 48. In response, search engine 48 searches its database 50 for Web documents that match the query or that are close to, but may not exactly match, the query. Search engine 48 displays a results list to the user in the browser.

Figure 2:
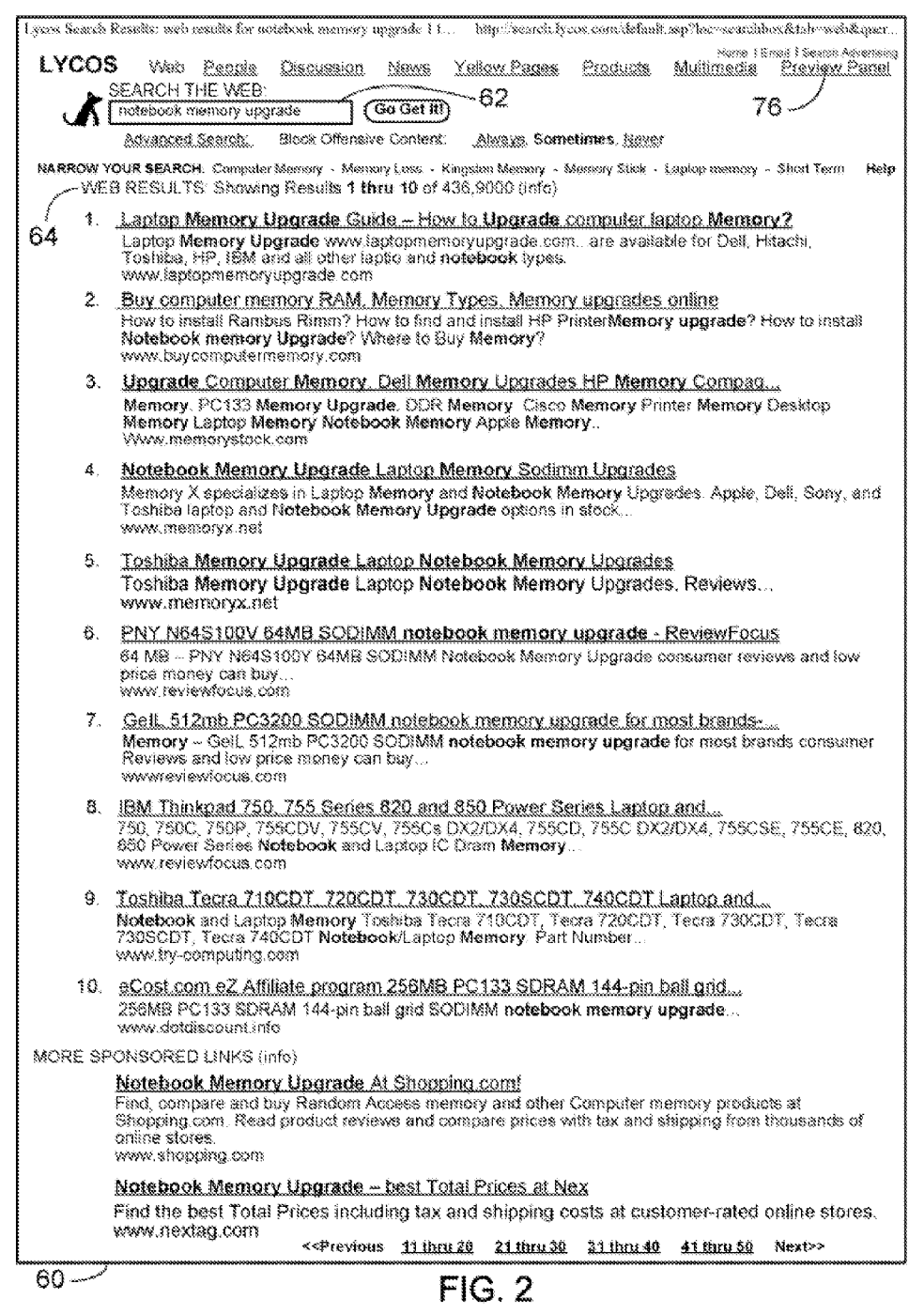

FIG. 2 shows an example of a browser screen 60 that displays search results 64 for keywords 62, namely "notebook", "memory" and "upgrade". In this implementation, the search results include hyperlinks to documents that contain the keywords. Preview panel process 100 enables a user to select one or more of the items/entries in the search results 64 list, and to place the one or more selected list items in an auxiliary display panel (the preview panel). The preview panel displays the selected items, and may display items from different pages of the same search or items culled from other searches. This enables the user to organize, and to retain, results from multiple search pages.

Figure 3:
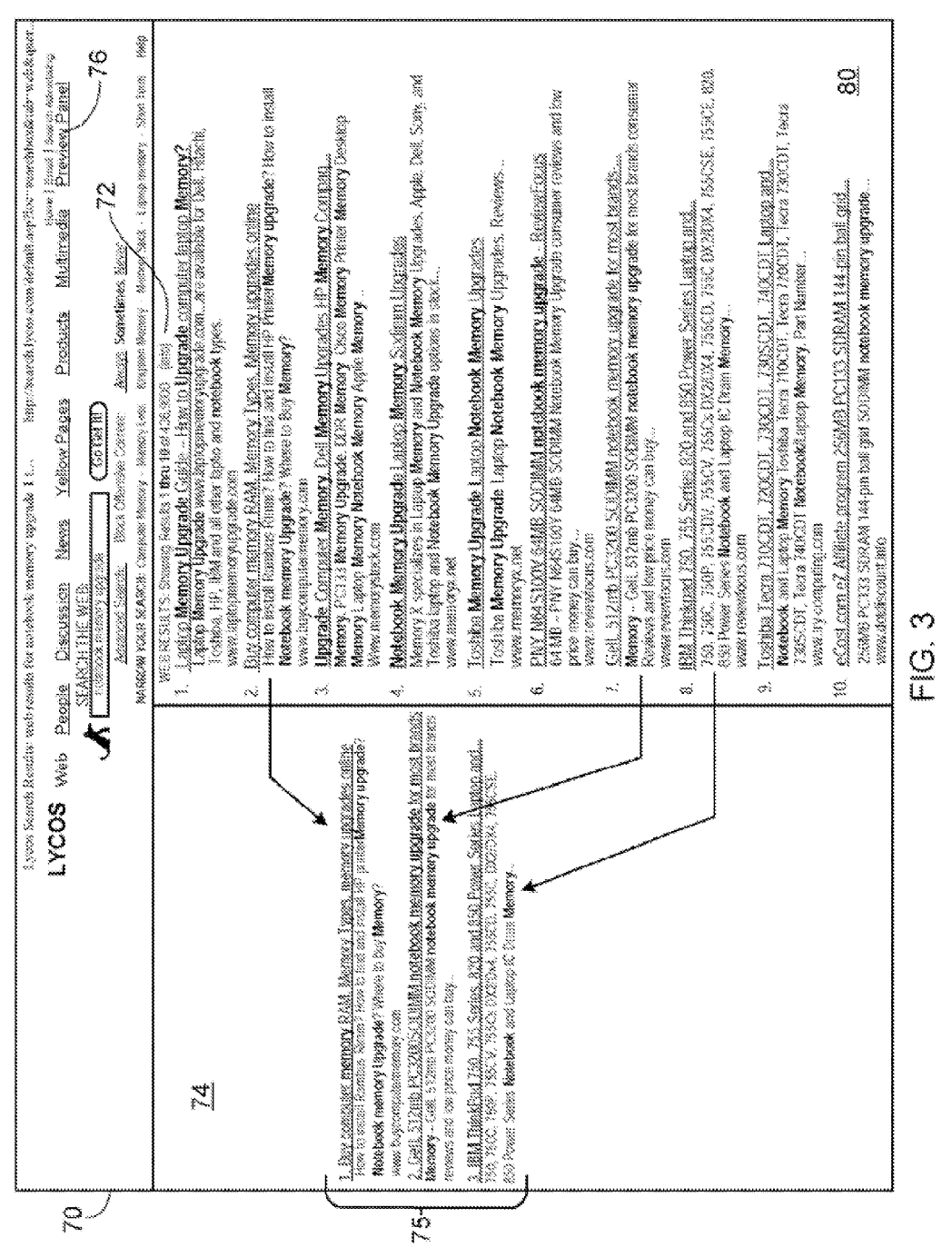

FIG. 3 shows an implementation of the preview panel. Referring to FIG. 3, a screen 70 displays results 72 of a current search and a preview panel 74. Preview panel 74 displays results culled from the current search and, in some implementations, may also display results of past and future searches (not shown here). In this example, preview panel 74 is populated through user input, such as a mouse click that selects a preview panel button 76. In more detail, a user clicks on preview panel button 76 and, in response, browser 28 sends data to process 100 to generate a preview panel. Process 100 receives the data from the browser and, in response, generates preview panel 74. In this implementation, preview panel 74 is analogous to a scratchpad in that it enables a user to generate a personalized list of Web results 72 that is separate from current search results displayed in a primary panel 80. It is noted that the user input may be keystroke(s) or any other user/computer interaction.

Referring to FIG. 3, when search results 72 are displayed in primary display panel 80, a user can select one or more of the search results. This may be done by pointing and clicking on a particular search result (e.g., right or left click) or by dragging and dropping a particular search result from the primary panel to the preview panel. In response, data is sent to process 100, which responds by copying the selected search result to preview panel 74. A copy of the selected search result remains in primary display panel 80, as shown in FIG. 3. In the example of FIG. 3, a user selects items "2," "7" and "8". Process 100 displays the selected items 75 in preview panel 74 as items "1," "2" and "3". In the implementation of FIG. 3, the entire search result is copied to preview panel 74. In other implementations, only a portion of the search result may be copied, e.g., the uniform resource locator (URL) only.

Figure 4:
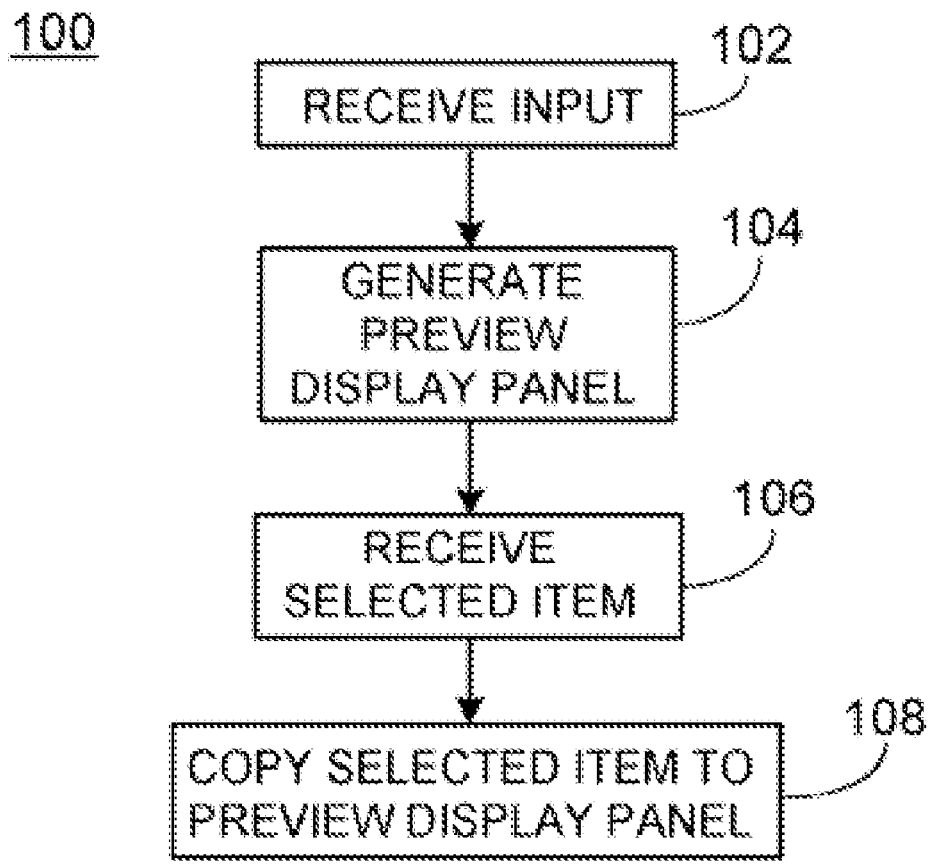
FIG. 4 is a flowchart of a process for generating the preview panel.

FIG. 4 is a flowchart showing actions that may be performed by preview panel process 100 to generate and to populate the preview panel. Referring to FIG. 4, preview panel process 100 receives (102) an input from a browser. The input may be, e.g., data indicating that preview panel button 76 has been selected. Process 100 generates (104) a preview panel in response to the input. That is, process 100 retains the current search results in primary panel 80 and generates an auxiliary panel—the preview panel—for use in displaying search results from the primary panel that are selected by the user.

Process 100 sends data corresponding to the preview panel to the user's browser, where the preview panel is presented. Process 100 receives (106) a selected item (or items) from a search results list that is displayed in the primary panel. In more detail, a user selects an item from primary panel 80. In response, data is sent from the user's browser to process 100. The data identifies which of the search results has been selected. Identification may be based on information transmitted as a result of clicking on a hyperlink for the first item. In response, process 100 copies (108) the selected item(s) for display in the preview panel. Alternatively, process 100 may send only a portion of the selected item(s) or augment the selected item(s) with additional content. Process 100 sends the resulting information to the user's computer, where it is displayed in the preview panel (in the user's browser).

As explained above, the contents of the preview panel may be retained from one search to another, and results from various searches and/or different pages of the same search may be combined in the same preview panel. For example, referring to FIG. 3, following the search for keywords "notebook", "memory" and "upgrade" 72, a user may perform a second search for "USB", "bus" and "adapter". The results of this second search (not shown) may be displayed in primary panel 80, taking the place of the search results for "notebook", "memory" and "upgrade". The originally selected items from the first search, namely items 75, however, may remain in preview panel 74. Items from the second search may be copied to preview panel 74, thereby augmenting the items 75 from the previous search. This may be the case for any number of searches. In some implementations, a user may be prompted to delete, or to retain, items in the preview panel. The prompt may be presented, e.g., between searches.

As noted above, in some implementations, an item presented in the preview panel may not be not an exact copy of the original item in the primary panel, but rather may contain more or less information than the original item.

The processes described herein (hereinafter, "the processes") can be implemented in digital electronic circuitry, or in computer hardware, firmware, software, or in combinations of them. The processes can be implemented as a computer program product, i.e., a computer program tangibly embodied in an information carrier, e.g., in one or more machine readable storage media or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

The processes can be performed by one or more programmable processors executing a computer program to perform functions of the processes by operating on input data and generating output. The processes can also be performed by, and apparatus that perform the processes can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer include a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

The processes can be implemented using a computing system that includes a back end component, e.g., as a data server, or that includes a middleware component, e.g., an application server, or that includes a front end component, e.g., a client computer having a graphical user interface or a Web browser through which a user can interact with an implementation of the processes, or any combination of such back end, middleware, or front end components. The components of the system can be interconnected by any form or medium of digital data communication, e.g., a communication network. Examples of communication networks include a LAN and a WAN, e.g., the Internet.

A computing system can include clients and servers. A client and server are generally remote from each other and typically interact through a communication network. The relationship of client and server arises by virtue of computer programs running on the respective computers and having a client-server relationship to each other.

The processes are not limited to use with the particular hardware or software described herein. Rather, the processes can be implemented with any networked device. Likewise, the processes are not limited to the specific network configurations and protocols described herein. Any configurations and protocols may be used.

It is noted that the preview panel described herein may be a display area that is separate from the primary panel. In other implementations, the preview panel may constitute a portion of the primary panel, i.e., it is not separate from the primary panel. The figures show the preview and primary panels aligned horizontally. However, they may also be aligned vertically or displayed in any other manner. For example, the preview panel may be a pop-up panel that is entirely separate from the primary panel, and that may be minimized between searches.

Elements of different implementations described herein may be combined to form other implementations not specifically set forth above. Other implementations not specifically described herein are also within the scope of the following claims.

What is claimed is:

1. A method performed by a server, comprising:
receiving data from a first panel displayed on a computer system that is not the server;
generating data for generating a second panel in response to the data from the first panel,
sending the data for generating the second panel to the computer system, the second panel being a pop-up window that is separate from, and that supplements, the first panel on the computer system;
identifying a first item from the first panel;
generating a second item corresponding to the first item for display in the second panel;
identifying a third item from the first panel, wherein the first item is obtained via a first search and the third item is obtained via a second search;
generating a fourth item corresponding to the third item for display in the second panel; and
augmenting the second panel to include the fourth item;
wherein, following prompting regarding the second panel, the second item remains displayed in the second panel through a time that the fourth item is displayed in the second panel; and
wherein generating the second item is performed by the server in response to dragging the first item from the first panel to the second panel on the computer system, and generating the fourth item is performed by the server in response to dragging the third item from the first panel to the second panel on the computer system.

2. The method of claim 1, wherein the first panel comprises a graphical user interface that is generated by a search engine, the first panel for displaying search results, the first item being among the search results; and
wherein the second panel comprises a graphical user interface, the second item containing information from the first item.

3. The method of claim 1, wherein identifying the first item comprises receiving data that identifies the first item, the data being received in response to user input; and
wherein at least part of the second item contains information that is identical to information in at least part of the first item.

4. The method of claim 1, wherein at least part of the fourth item contains information that is identical to information in at least part of the third item.

5. The method of claim 1, wherein the first item comprises a Web search result entry that includes a uniform resource locator (URL) hyperlink.

6. The method of claim 1, wherein the first item from the first panel is identified based on information obtained from a hyperlink associated with the first item.

7. The method of claim 1, wherein the second item is a copy of the first item, and the fourth item is a copy of the third item.

8. A method performed by a server, comprising:
generating data for presenting an auxiliary display in response to an action performed in a primary display, the primary display for presenting one or more entries that correspond to results of a Web-based search, the auxiliary display being a pop-up window that is separate from the primary display;
sending the data for presenting the auxiliary display to a computer system that is not the server, the auxiliary display and the primary display being presented on the computer system;
receiving data identifying a first entry from the primary display;
generating, for presentation in the auxiliary display, first information corresponding to the first entry from the primary display;
receiving data identifying a second entry from the primary display;
generating, for presentation in the auxiliary display, second information corresponding to the second entry from the primary display; and
augmenting the auxiliary display to include the second information;
wherein the first entry is a result of a first Web-based search for which one or more entries are displayed on the primary display, and the second entry is a result of a second Web-based search for which one or more entries are displayed on the primary display;
wherein, following prompting regarding the auxiliary display, the first information remains displayed in the auxiliary display through a time that the second information is displayed in the auxiliary display; and
wherein the data identifying the first entry is received in response to dragging the first entry from the primary display to the auxiliary display, and the data identifying the second entry is received in response to dragging the third entry from the primary display to the auxiliary display.

9. The method of claim 8, wherein at least one of the following holds true:
the first information comprises a copy of the first entry from the primary display; and
the second information comprises a copy of the second entry from the primary display.

10. One or more machine-readable storage media comprising instructions that are executable by a server, the one or more-machine readable media being non-transitory, the instructions for causing one or more processing devices of the server to:
receive data from a first panel displayed on a computer system that is not the server;
generate data for generating a second panel in response to the data from the first panel,
send the data for generating the second panel to the computer system, the second panel being a pop-up window that is separate from, and that supplements, the first panel on the computer system; and
identify a first item from the first panel; and
generate a second item corresponding to the first item for display in the second panel;
identify a third item from the first panel, wherein the first item is obtained via a first search and the third item is obtained via a second search;
generate a fourth item corresponding to the third item for display in the second panel; and
augment the second panel to include the fourth item;
wherein, following prompting regarding the second panel, the second item remains displayed in the second panel through a time that the fourth item is displayed in the second panel; and
wherein generating the second item is performed by the server in response to dragging the first item from the first panel to the second panel on the computer system, and generating the fourth item is performed by the server in response to dragging the third item from the first panel to the second panel on the computer system.

11. The one or more machine-readable storage media of claim 10, wherein the first panel comprises a graphical user interface that is generated by a search engine, the first panel for displaying search results, the first item being among the search results; and
wherein the second panel comprises a graphical user interface, the second item containing information from the first item.

12. The one or more machine-readable storage media of claim 10, wherein identifying the first item comprises receiving data that identifies the first item, the data being received in response to user input; and
wherein at least part of the second item contains information that is identical to information in at least part of the first item.

13. The one or more machine-readable storage media of claim 10, wherein at least part of the fourth item contains information that is identical to information in at least part of the third item.

14. The one or more machine-readable storage media of claim 10, wherein the first item comprises a Web search result entry that includes a uniform resource locator (URL) hyperlink.

15. The one or more machine-readable storage media of claim 10, wherein the first item from the first panel is identified based on information obtained from a hyperlink associated with the first item.

16. The one or more machine-readable media of claim 10, wherein the second item is a copy of the first item, and the fourth item is a copy of the third item.

17. One or more machine-readable storage media comprising instructions that are executable on a server, the one or more-machine readable media being non-transitory, the instructions for causing one or more processing devices of the server to:
generate data for presenting an auxiliary display in response to an action performed in a primary display, the primary display for presenting one or more entries that correspond to results of a Web-based search, the auxiliary display being a pop-up window that is separate from the primary display;
send the data for presenting the auxiliary display to a computer system that is not the server, the auxiliary display and the primary display being presented on the computer system;

receive data identifying a first entry from the primary display;

generate, for presentation in the auxiliary display, first information corresponding to the first entry from the primary display;

receive data identifying a second entry from the primary display;

generate, for presentation in the auxiliary display, second information corresponding to the second entry from the primary display; and augment the auxiliary display to include the second information;

wherein the first entry is a result of a first Web-based search for which one or more entries are displayed on the primary display, and the second entry is a result of a second Web-based search for which one or more entries are displayed on the primary display;

wherein, following prompting regarding the auxiliary display, the first information remains displayed in the auxiliary display through a time that the second information is displayed in the auxiliary display; and wherein the data identifying the first entry is received in response to dragging the first entry from the primary display to the auxiliary display, and the data identifying the second entry is received in response to dragging the third entry from the primary display to the auxiliary display.

18. The one or more machine-readable storage media of claim 17, wherein at least one of the following holds true:

the first information comprises a copy of the first entry from the primary display; and the second information comprises a copy of the second entry from the primary display.

19. An apparatus comprising a processing device programmed to:

receive data from a first panel displayed on a computer system that is not the apparatus;

generate data for generating a second panel in response to the data from the first panel, send the data for generating the second panel to a computer system, the second panel being a pop-up window that is separate from, and that supplements, the first panel on the computer system;

identify a first item from the first panel; and generate a second item corresponding to the first item for display in the second panel;

identify a third item from the first panel, wherein the first item is obtained via a first search and the third item is obtained via a second search;

generate a fourth item corresponding to the third item for display in the second panel; and augment the second panel to include the fourth item;

wherein, following prompting regarding the second panel, the second item remains displayed in the second panel through a time that the fourth item is displayed in the second panel; and wherein generating the second item is performed by the apparatus in response to dragging the first item from the first panel to the second panel on the computer system, and generating the fourth item is performed by the apparatus in response to dragging the third item from the first panel to the second panel on the computer system.

20. An apparatus comprising a processing device programmed to:

generate data for presenting an auxiliary display in response to an action performed in a primary display, the primary display for presenting one or more entries that correspond to results of a Web-based search, the auxiliary display being a pop-up window that is separate from the primary display;

send the data for presenting the auxiliary display to a computer system that is not the apparatus, the auxiliary display and the primary display being presented on the computer system;

receive data identifying a first entry from the primary display;

generate, for presentation in the auxiliary display, first information corresponding to the first entry from the primary display;

receive data identifying a second entry from the primary display;

generate, for presentation in the auxiliary display, second information corresponding to the second entry from the primary display; and augment the auxiliary display to include the second information;

wherein the first entry is a result of a first Web-based search for which one or more entries are displayed on the primary display, and the second entry is a result of a second Web-based search for which one or more entries are displayed on the primary display;

wherein, following prompting regarding the auxiliary display, the first information remains displayed in the auxiliary display through a time that the second information is displayed in the auxiliary display; and wherein the data identifying the first entry is received in response to dragging the first entry from the primary display to the auxiliary display, and the data identifying the second entry is received in response to dragging the third entry from the primary display to the auxiliary display.

* * * * *

UNITED STATES PATENT AND TRADEMARK OFFICE
CERTIFICATE OF CORRECTION

PATENT NO. : 8,082,516 B2
APPLICATION NO. : 11/590682
DATED : December 20, 2011
INVENTOR(S) : Julio Vaca It is certified that error appears in the above-identified patent and that said Letters Patent is hereby corrected as shown below:

Column 7, Line 59, Claim 10:
delete "more-machine readable" and insert -- more machine-readable --, therefor.

Column 8, Line 55, Claim 17:
delete "more-machine readable" and insert -- more machine-readable --, therefor.

Signed and Sealed this
Sixth Day of March, 2012

David J. Kappos
*Director of the United States Patent and Trademark Office*